United States Patent Office 3,290,963
Patented Dec. 13, 1966

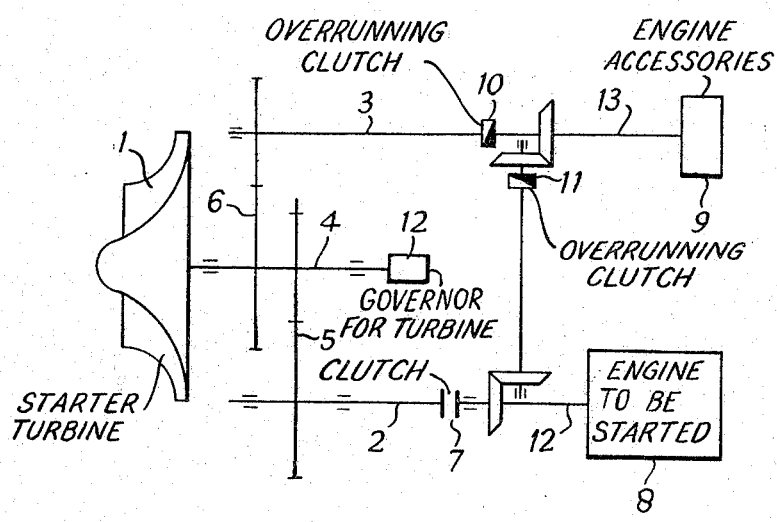

3,290,963
TURBINE DRIVEN GEAR TRAIN FOR ENGINE STARTING AND ENGINE ACCESSORY DRIVE
Thomas Alfred Oldfield and Kenneth Gordon Wallace, Warsash, England, assignors to Plessey-UK Limited, Ilford, England, a British company
Filed May 1, 1964, Ser. No. 364,334
Claims priority, application Great Britain, May 3, 1963, 17,545/63
3 Claims. (Cl. 74—810)

This invention relates to engine-starter systems which are combined with a so-called accessory-ground-running system adapted to drive engine accessories, for example for testing purposes, or for maintaining essential auxiliary services in an aircraft when the main engine is at a standstill. For this purpose it has previously been proposed to make arrangements which permit the engine accessories to remain coupled to the starter-output shaft when the engine is uncoupled therefrom. An arrangement of this kind suffers however from the disadvantage that the starter motor reaches its maximum speed at the so-called starter-decoupling speed of the engine, which is normally well below engine-idling speed, and that therefore the speed at which the accessories can be driven for ground running by this arrangement is considerably lower than the speed at which they are driven by the engine when the engine runs at its normal cruising speed.

According to the present invention this difficulty is substantially overcome by equipping the starter system, in addition to its normal output shaft for connection to the engine, with a second output shaft which is driven by the starter motor at a substantially higher speed than the normal output shaft, and connecting the engine accessories to this second output shaft with the interposition of an overrunning clutch which allows the accessories to be driven by the engine at a higher speed than that by which they would be driven by the second output shaft, a second overrunning clutch being interposed between the engine and the accessories so as to allow the accessories to be driven by the second output shaft at a higher speed than that at which they would be driven by the engine.

The invention is diagrammatically illustrated in the accompanying drawing, in which the starter motor, represented as a starter turbine 1, has a shaft 4 which drives a main output shaft 2 by a low-ratio gear drive 5 and a second output shaft 3 by a higher-ratio gear drive 6 so that the second output shaft 3 rotates at, say, twice the speed at which the main output shaft 2 is driven. The main output shaft 2 is coupled by a disengageable clutch 7 via an engine shaft 12 to the engine to be started, which is shown at 8, while the second output shaft 3, which is driven at a higher speed than the main output shaft 2, is coupled to an accessory shaft 13 driving accessories 9 of the engine 8 through an overrunning clutch 10. Another overrunning clutch 11, interposed between the engine 8 and the accessory shaft 13 connected to the engine accessories 9, is so arranged as to allow the engine to drive the accessories 9 when the speed of the engine shaft is higher than that of the shaft 3, in which case the drive of the accessories from the engine in overtaking the drive from the shaft 3 will disengage the overrunning clutch 10, while conversely when the engine speed is low during starting of the engine, the overrunning clutch 10 will become engaged to drive the accessories 9 at the speed of the second output shaft 3, and as long as the speed of the shaft 3 is higher than the speed supplied from the engine, the overrunning clutch 11 between the engine 8 and the accessories 9 will be disengaged. Under so-called ground-running conditions when the engine remains at rest, the clutch 7 between the main output shaft 2 and the engine is disengaged. In this case the accessories are driven by the starter turbine 1 via the second speed output shaft 3 and may be thus driven at substantially the same speed at which they would be driven by the engine under cruising conditions, without the need to raise the speed of the starter turbine 1 very much above the speed which it reaches at the end of a normal starting operation.

When the invention is to be applied to starter systems such as that described in British specification No. 1,025,782 in which a starter motor is arranged to drive a turbine engine to be started through a three-element differential gear drive the third element of which is coupled to a turbine- and compression-unit supplying the combustion air for the turbine engine the drive of the second output shaft is derived from that element of the said differential gear drive which is normally coupled to the engine.

What we claim is:

1. A combined engine-starter and accessory-drive system, comprising an input shaft for connection to a starter motor, an engine shaft, a main output shaft, disengageable coupling means for connecting said main output shaft to the engine shaft, an accessory shaft, first drive-transmission means interconnecting said input shaft to said main output shaft for transmitting rotation thereto from the input shaft at a first speed ratio relative to the speed of said input shaft, second drive-transmission means, including a first overrunning clutch, operatively connecting the engine shaft to the accessory shaft for transmitting rotation of one predetermined direction from the engine shaft to the accessory shaft at a second ratio relative to the speed of the engine shaft but allowing the accessory shaft to overtake the speed thus transmitted from the engine shaft, and third drive-transmission means operatively connecting said input shaft to the accessory shaft at a third speed ratio relative to the speed of the input shaft, the third speed ratio being higher than the product of said first and second speed ratios, and said third drive-transmission means including a second overrunning clutch arranged to transmit rotation of said one direction from the input shaft to the accessory shaft but to allow the accessory shaft to overtake the speed thus transmitted from the input shaft.

2. A combined-engine starter and accessory-drive system as claimed in claim 1, also including a starter turbine as the starter motor drivingly connected to the input shaft, an engine connected to the engine shaft, and an engine accessory connected to the accessory shaft, a second output shaft forming part of the third drive transmission, and said second overrunning clutch being interposed bewteen said second output shaft and the accessory shaft.

3. An engine-starter and accessory-drive system as claimed in claim 2, wherein the starter turbine includes a gas turbine and a speed governor controlling the speed of said turbine.

References Cited by the Examiner
UNITED STATES PATENTS

| 2,559,006 | 7/1951 | Clapham | 60—39.14 |
|---|---|---|---|
| 2,806,351 | 9/1957 | Kent et al. | 60—39.14 |
| 2,850,876 | 9/1958 | Wood | 60—39.14 X |
| 2,972,911 | 2/1961 | Volk et al. | 60—39.14 X |
| 3,097,485 | 7/1963 | Bidwell | 60—39.14 X |
| 3,100,378 | 8/1963 | Austin et al. | 60—39.16 X |

JULIUS E. WEST, *Primary Examiner.*